(12) United States Patent
Wijnands et al.

(10) Patent No.: US 11,627,086 B2
(45) Date of Patent: *Apr. 11, 2023

(54) PROCESSING PACKETS BY AN OFFLOAD PLATFORM ADJUNCT TO A PACKET SWITCHING DEVICE

(71) Applicant: Cisco Technology, Inc., San Jose, CA (US)

(72) Inventors: Ijsbrand Wijnands, Leuven (BE); Neale David Raymond Ranns, Basingstoke (GB); David Delano Ward, Somerset, WI (US); David Richard Barach, Mount Dora, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,803

(22) Filed: Jul. 25, 2022

(65) Prior Publication Data
US 2022/0368636 A1    Nov. 17, 2022

Related U.S. Application Data

(63) Continuation of application No. 16/528,342, filed on Jul. 31, 2019, now Pat. No. 11,398,983.
(Continued)

(51) Int. Cl.
*H04L 12/26* (2006.01)
*H04L 47/125* (2022.01)
(Continued)

(52) U.S. Cl.
CPC .......... *H04L 47/125* (2013.01); *H04L 45/507* (2013.01); *H04L 47/17* (2013.01); *H04L 47/825* (2013.01)

(58) Field of Classification Search
None
See application file for complete search history.

(56) References Cited

U.S. PATENT DOCUMENTS 9,660,897 B1    5/2017  Gredler
10,333,853 B1 *  6/2019  Seshadri ................ H04L 45/20
(Continued)

OTHER PUBLICATIONS

Deering and Hinden, "Internet Protocol, Version 6 (IPv6) Specification," RFC 8200, Jul. 2017, The Internet Society, Reston, VA, USA (42 pages).
(Continued)

*Primary Examiner* — Zewdu A Beyen
(74) *Attorney, Agent, or Firm* — Polsinelli

(57) ABSTRACT

In one embodiment, an offload platform is an compute platform, adjunct to a router or other packet switching device, that performs packet processing operations including determining an egress forwarding value corresponding to the next-hop node of the packet switching device to which to send an offload-platform processed packet. The offload platform downloads forwarding information from the router, and augments it, such as, but not limited to, representing interfaces of the router as identifiable virtual interface(s) on the offload platform, and including each of one or more next-hop nodes of the router represented as an identifiable virtual adjacency and identifiable tunnel (e.g., identified by the egress forwarding value). In one embodiment, the egress forwarding value is an Multiprotocol Label Switching (MPLS) label or Segment Routing Identifier. The router identifies packets of certain packet flows to send to the adjunct offload platform, rather than processing per its routing information base.

20 Claims, 12 Drawing Sheets

Related U.S. Application Data

(60) Provisional application No. 62/755,510, filed on Nov. 4, 2018.

(51) Int. Cl.
*H04L 47/70* (2022.01)
*H04L 47/17* (2022.01)
*H04L 45/50* (2022.01)

(56) References Cited

U.S. PATENT DOCUMENTS

| | | | | |
|---|---|---|---|---|
| 2014/0160940 | A1* | 6/2014 | Maehara | H04W 36/18 370/237 |
| 2015/0309894 | A1* | 10/2015 | Zhou | H04L 45/02 714/4.11 |
| 2018/0213018 | A1* | 7/2018 | Madani | H04L 67/561 |
| 2018/0375684 | A1 | 12/2018 | Filsfils et al. | |

OTHER PUBLICATIONS

Farinacci et al., "Generic Routing Encapsulation (GRE)," RFC 2784, Mar. 2000, The Internet Society, Reston, VA, USA (9 pages).
Rosen et al., "Multiprotocol Label Switching Architecture," RFC 3031, Jan. 2001, The Internet Society, Reston, VA, USA (61 pages).
Miahalingam et al., "Virtual Extensible Local Area Network (VXLAN): A Framework for Overlaying Virtualized Layer 2 Networks over Layer 3 Networks," RFC 7348, Aug. 2014, The Internet Society, Reston, VA, USA (22 pages).
Sajassi et al., "BGP MPLS-Based Ethernet VPN," Feb. 2015, The Internet Society, Reston, VA, USA (56 pages).
Quinn et al., "Network Service Header (NSH)," RFC 8300, Jan. 2018, The Internet Society, Reston, VA, USA, (40 pages).
J. Halpern, Ed. and C. Pignataro, Ed., "Service Function Chaining (SFC) Architecture," RFC 7665, Oct. 2015, The Internet Society, Reston, VA, USA (32 pages).
S. Previdei, Ed. et al., "IPv6 Segment Routing Header (SRH)," draft-ietf-6man-segment-routing-header-07, Jul. 20, 2017, The Internet Society, Reston, VA, USA (34 pages).
Filsfils, Ed. et al., "Segment Routing Architecture," draft-ietf-spring-segment-routing-12, Jun. 20, 2017, The Internet Society, Reston, VA, USA (28 pages).
Filsfils et al., "Segment Routing Policy for Traffic Engineering," draft-filsfils-spring-segment-routing-policy-01.txt, Jul. 3, 2017, The Internet Society, Reston, VA, USA (30 pages).
Filsfils et al., "SRv6 Network Programming," draft-filsfils-spring-srv6-network-programming-01, Jun. 28, 2017, The Internet Society, Reston, VA, USA (42 pages).
Luc De Ghein, "MPLS Fundamentals: Forwarding Labeled Packets," Jan. 5, 2007, http://www.ciscopress,com/articles/article.asp?p=680824, Cisco Systems, Inc., San Jose, CA (5 pages).
"Configuring Virtual Interfaces," Jan. 19, 2018, Interface and Hardware Component Configuration Guide, Cisco IOS XE Release 3S, Cisco Systems, Inc., San Jose, CA (14 pages).
"Configuring Virtual Interfaces," 2015, Cisco IOS Interface and Hardware Component Configuration Guide, Cisco Systems, Inc., San Jose, CA (12 pages).
"Configuring Tunnel Interfaces on Cisco IOS XR Software," Sep. 19, 2016, Cisco IOS XR Interface and Hardware Component Configuration Guide for the Cisco CRS Router, Cisco Systems, Inc., San Jose, CA (8 pages).
"Implementing Tunnels," 2014, Interface and Hardware Component Configuration Guide, Cisco IOS Release 15S, Cisco Systems, Inc., San Jose, CA (68 pages).

\* cited by examiner

PROCESSING PACKETS BY AN OFFLOAD PLATFORM ADJUNCT TO A PACKET SWITCHING DEVICE

CROSS-REFERENCE TO RELATED APPLICATIONS

This application is a continuation of U.S. patent application Ser. No. 16/528,342, filed on Jul. 31, 2019, which in turn, claims the benefit of U.S. Provisional Application No. 62/755,510, filed Nov. 4, 2018, both of which are hereby incorporated by reference in their entirety.

TECHNICAL FIELD

The present disclosure relates generally to packet switching network communications, including, but not limited to, improved packet processing operations performed by offload packet processing platform(s) adjunct to packet switching device(s).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
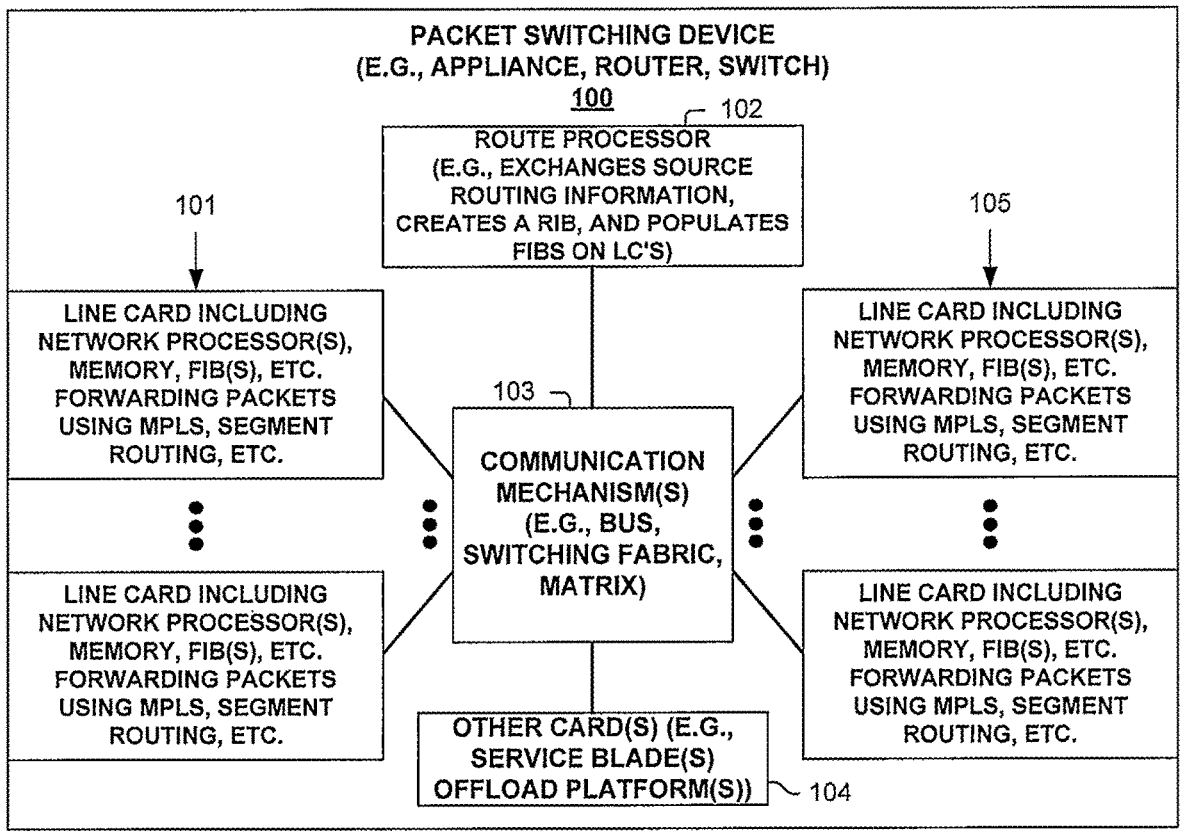
FIG. 1A illustrates a packet switching device according to one embodiment.

Disclosed are, inter alia, methods, apparatus, computer-storage media, mechanisms, and means associated with packet processing operations performed using an offload platform adjunct to a packet switching device (e.g., router).

A method according to one embodiment, includes: receiving a particular packet by an offload platform from a router in a network; offload-packet processing the particular packet by the offload engine resulting in an offload-processed packet encapsulated in an encapsulating packet including a particular egress forwarding value; and sending the encapsulating packet by the offload platform towards the router. In one embodiment, the
offload platform is an adjunct compute platform to the router; and said offload-packet processing includes performing a forwarding lookup operation in an offload platform forwarding information base resulting in an identification of the particular egress forwarding value that effectively identifies a particular next-hop node of the router or corresponding egress interface of the router for reaching the particular next-hop node.

In one embodiment, the router receives the encapsulating packet; and responsive to the particular egress forwarding value in said received encapsulating packet, the router sends the offload-packet processed packet towards the particular next-hop node from the corresponding egress interface. In one embodiment, the particular egress forwarding value is a particular Multiprotocol Label Switching (MPLS) label. In one embodiment,
the adjunct compute platform processes the particular packet using Vector Packet Processing (VPP).

One embodiment includes a method, comprising: configuring an offload forwarding information base of an offload platform, communicatively coupled to a router, with the offload forwarding information base including each of one or more interfaces of the router represented as an identifiable virtual interface on the offload platform, and including each of one or more next-hop nodes of the router represented as an identifiable virtual adjacency and identifiable tunnel; and packet processing, by the offload platform, each particular packet of a plurality of packets, with said packet processing including determining a corresponding said identifiable tunnel based on a lookup operation on an Internet Protocol (IP) Destination Address of said particular packet in the offload forwarding information base, and sending said particular packet over the corresponding
said identifiable tunnel to the router.

In one embodiment, said sending said particular packet over the said determined corresponding identifiable tunnel includes encapsulating said particular packet in an encapsulating packet including an egress forwarding value identifying said determined corresponding said identifiable tunnel, and sending the encapsulating packet from the offload platform towards the router. In one embodiment, the egress forwarding value is an Multiprotocol Label Switching (MPLS) label or a Segment Routing Identifier.

In one embodiment, said configuring the offload forwarding information base includes downloading forwarding information from a routing information base of the router. One embodiment includes configuring a router forwarding information base of the router to send each of the plurality of packets to the offload platform instead of to a next-hop node of the router per the routing information base. One embodiment includes configuring a router forwarding information base, in deviation from the programming of the routing information base of the router to forward to a next-hop node of the router, to encapsulate in a corresponding encapsulating packet, including an offload feature value identifying the router, each of the plurality of packets and send the corresponding encapsulating packet to the offload platform. One embodiment includes sending each received said sent particular packet out an interface of the router towards a next-hop node corresponding to said tunnel on which said particular packet was received.

2. Example Embodiments

Disclosed are, inter alia, methods, apparatus, computer-storage media, mechanisms, and means associated with packet processing operations performed by one or more adjunct packet processing offload platforms in conjunction with one or more packet switching devices. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processor refers to a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device. The "router" (one type of packet switching device) is often used herein in describing one embodiment, with the teachings applicable to other types of packet switching devices (e.g., switches).

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

One embodiment of a packet switching device 100 is illustrated in FIG. 1A. Packet switching device 100 includes multiple line cards 101 and 105, each with one or more network interfaces for sending and receiving packets over single or aggregated communications links (e.g., electrical, optical, radio) and with one or more processors that are used in one embodiment. Packet switching device 100 includes a route processor 102 comprising one or more processors used in implementing a control plane for a network node. Packet switching device 100 includes other cards 104 (e.g., service cards and/or blades that possibly might implement an packet processing offload platform internal to packet switching device 100), which include processors used in processing packets (e.g., forward/send, drop, manipulate, change, modify, receive, create, duplicate, apply a service), and some hardware-based communication mechanism 103 (e.g., bus, switching fabric, matrix, etc.) providing communication among its different entities 101, 102, 104 and 105. Line cards 101 and 105 typically perform the actions of being both an ingress and egress line card. In one embodiment, network processors on line cards 101 and/or 105 use a packet encapsulating protocol, such as, but not limited to, Multiprotocol Label Switching (MPLS) or Segment Routing, in communicating with an offload platform.

Figure 1B:
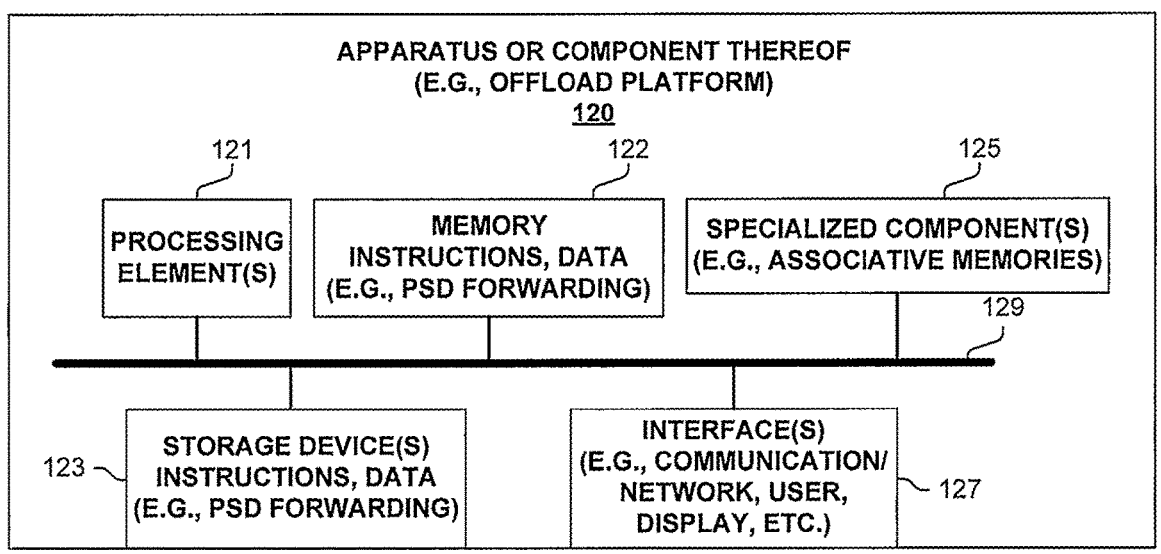
FIG. 1B illustrates an apparatus or component thereof according to one embodiment.

FIG. 1B is a block diagram of an apparatus 120 used in one embodiment. In one embodiment, apparatus 120 performs one or more processes, or portions thereof, as illustrated and/or otherwise described herein. In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, associative memory, binary and/or ternary content-addressable memory, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

One embodiment implements an infrastructure that is used by a packet switching device (e.g., router/switch) to offload specific packet processing tasks, including many routing features, to a communicatively coupled adjunct packet processing offload platform (e.g., a compute platform). In one embodiment, the compute platform is a Unified Computing System (UCS) using Vector Packet Processing (VPP), also referred to as Platform Independent VPP Offload (PIVO).

Using one embodiment, network operators deploy, possibly incrementally, new/innovation technologies/features without depending on the packet switching device hardware (e.g., a forwarding engine) to support their implementation. In one embodiment, customers implement new features in the network with limited or no impact on existing features performed by the packet switching device. In one embodiment, features that do not require full bandwidth (e.g., features that can be offloaded from the packet switching device) are deployed as production features using offload platform(s).

An adjunct packet processing offload platform according to one embodiment provides rapid introduction of new features, especially those features that have a strong dependency on forwarding capabilities. The offload platform offloads specific forwarding features from the packet switching device in providing advanced features that may not be currently supported by the packet switching device (e.g., possibly due to configuration or current resource constraints).

In one embodiment, an offload platform uses a modified view of the routing and forwarding tables of the router, and directs packets to the next hop neighbors of the router, without the router performing any special processing to determine the next hop to which to forward these packets. In one embodiment, unicast encapsulation is used to communicate packets between a router and an offload platform. In particular, one embodiment uses MPLS to encapsulate and communicate packets back and forth from the router to the offload platform.

In one embodiment, the use of an offload platform is hidden from the rest of the network in the sense that it is not externally viewed as a different network node (albeit typically implemented in a separate chassis); with the additional functionality provided by the offload platform viewed by other network nodes as functionality provided by the associated router. In other words, other network nodes view a router and its associated offload platforms as a single network node.

In one embodiment, offload platform-router architecture includes classification of packet traffic on the router to determine which packets are subsequently forwarded to the offload platform for packet processing and then returned to the router. One embodiment uses network service chaining processing on a router to assist in the classification of packet traffic, such as to identify packets that require special handling.

In one embodiment, network features (e.g., Bit Indexed Explicit Replication/"BIER") require additional information for packet processing by the offload platform. This this information typically downloaded from the router (or from a controller) to the offload platform. In one embodiment, an offload platform-client component on the router provides a library that allows feature data to be easily downloaded to the offload platform. In one embodiment, an additional TCP session is established between the router and the offload for such downloading of control plane information, that allows data to be exchanged between the feature component and the offload platform without any additional context switching among or between processes on the router.

One embodiment is communicatively coupled to one or more routers, while not being visible to other routers in the network. Typically, these one or more routers will continue to perform existing (e.g., commodity) features (unless offloaded to the offload platform), with new or existing features offloaded to the offload platform.

One embodiment creates a complete forwarding state mirror of the router on the offload platform, thus alleviating the need for a complex service insertion architecture (SIA). This mirrored state is then augmented to represent router physical interfaces as virtual interfaces.

In one embodiment, an offload platform is a x86 platform (e.g., UCS) running VPP forwarding software providing a very fast packet processing and forwarding path to the router. The offload platform is attached (directly or remote) to the router and is used as a forwarding assist. The relevant portion of the router's control-plane is download to, and used by, the offload platform. The offload platform does not replace a router (rather it offload processes packets received from a router), and does not require a network wide architecture (e.g., that is typical of service function chaining).

In one embodiment, an offload platform includes a dedicated forwarding processing unit (e.g., x86 VPP Forwarder) running VPP and is able to process at least 1.3 Terabits of packet traffic. However, the amount of data that an offload platform is able to handle is often dependent on the number of links between the router the offload platform, and is therefore scaled to satisfy the processing needs.

Vector Packet Processing (VPP) forwarding performance provides a very fast software forwarding path through the offload platform in one embodiment. The offload platform is communicatively coupled to the router via one or multiple router ports. The forwarding speeds VPP supports is basically line rate for a 10G interface. Depending on the bandwidth requirements, the offload platform is connected to multiple ports to increase the throughput. One embodiment also connects multiple offload platforms to increase throughput and reliability. In one embodiment, the offload platform is connected directly to the router. In one embodiment, the offload platform is connected remotely over a cloud network. In one embodiment, the offload platform is implemented on a service blade in the router. When connected via multiple connections (e.g., links), equal-cost multi-path routing (ECMP) is typically used to distribute traffic across the multiple connections.

In one embodiment, the router downloads an augmented mirror of the full forwarding state onto the offload platform (e.g., from the router or a controller). The offload platform has the resources and capability to perform all of the forwarding actions that the router performs (if so programmed) as well as new or different features not currently performed by the router. The offload platform is typically inserted into the router's switch-path in a same position in the packet processing path that it would be if the router performed the packet processing performed by the offload platform (e.g., an input feature or a particular prefix lookup), and the forwarding rules send matching packets to the offload platform, encapsulated in an MPLS packet with an MPLS label imposed. In one embodiment, this MPLS label is not taken from the router's global table, but rather is pre-installed on the offload platform and links into the mirrored forwarding path, just before feature execution. In one embodiment, the offload platform has the full forwarding state, so the feature is able to make a fully informed routing decisions (e.g.,
choose the egress interface based on a forwarding lookup operation).

Figure 2A:
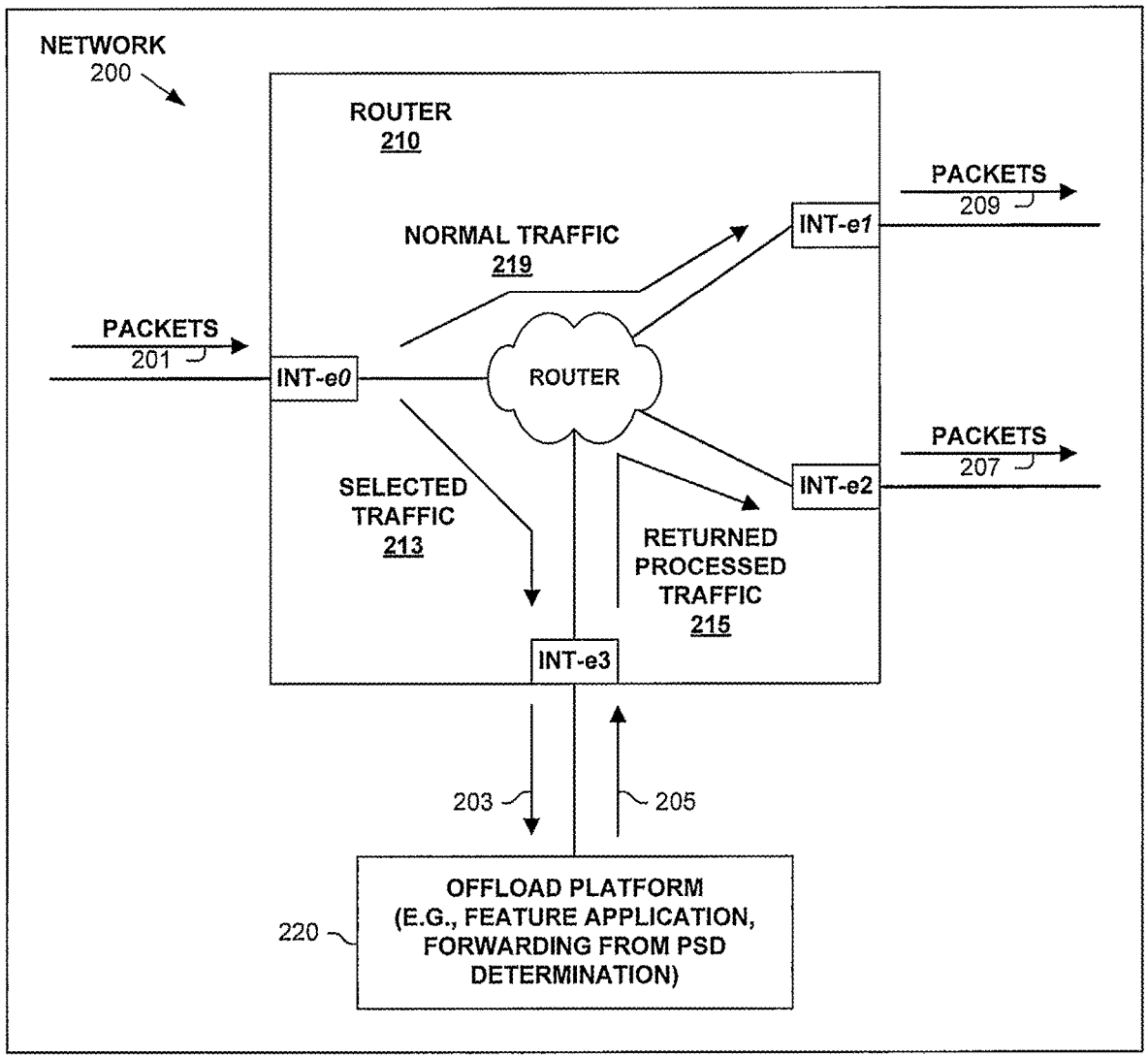
FIG. 2A illustrates a network node operating according to one embodiment.

FIG. 2A illustrates a network 200 that includes router 210 and offload platform 220 according to one embodiment. Router 210 receives and processes packets 201. In one embodiment, router 210 identifies packets 213 (e.g., unicast packets) using packet classification. In one embodiment, selected packet traffic 213 is hair-pined as packets 203, 205 through offload platform 220 for additional packet processing.

In one embodiment, packets of an identified first subset of packet traffic (labeled as "normal traffic" 219) are processed by router 210 independent of offload platform 220. Router-processed packets 209 are sent into network 200.

In one embodiment, packets of an identified second subset of packet traffic (labeled as "selected traffic" 213) is processed by router 210 in conjunction with offload platform 220. Selected traffic packets 213 are communicated as packets 203 to offload platform 220, with the offload-platform processed packets communicated as packets 205 to router 210 for processing, including communicating (215) resultant packets to appropriate interface(s), with packets 207 being sent into network 200.

In one embodiment, Vector Packet Processing (VPP) forwarding code of offload platform 220 implements specific feature(s) applied to received packets 203, with offload-platform processed packets 205 communicated to router 210.

In one embodiment, offload platform 220 is a forwarding assist for specific forwarding features, possibly features not currently supported by router 210. A broad range of policies are applied to packets in one embodiment of offload platform 220, with these policies including, but not limited to, packet filtering, shaping, marking advanced Quality of Service (QoS) features, Internet Protocol version 6 (IPv6), mLDP (Multipoint Label Distribution Protocol), Bit Index Explicit Replication (BIER), Hybrid Information-Centric Networking (Hybrid-ICN), in-band Operations Administration Maintenance (In-situ OAM), Segment Routing (e.g., SRv6), Analytics, Multicast only Fast Re-Route (MoFRR) path selector function, replication in general, and supplemental processing such as when router 210 runs out of hardware resources (e.g., Access Control List (ACL) tables, Ternary Content-addressable Memory entries, binary TCAM, Content-addressable Memory entries).

In one embodiment, offload platform 220 provides a fully flexible forwarding path as an additional resource to router 210, such as, but not limited to selective traffic 213 being looped through the offload platform 220 for special handling and/or applying a network service. In one embodiment, Multiprotocol Label Switching (MPLS) is used to transport packet traffic (e.g., packets 203, packets 205) between router 210 and offload platform 220. In one embodiment, another forwarding, tunneling, service overlay or other technology (e.g., that encapsulates the original packets) is used in transporting packets between router 210 and offload platform 220.

In one embodiment, router 210 provides control plane processing, with offload platform 220 relying on the control plane of router 210 (e.g., rather than performing its own full control plane processing). In one embodiment, router local labels are allocated for the next hops of router 210. Offload platform 220 is programmed with a forwarding information base (FIB) (e.g., downloaded from router 210, controller, management entity) that includes the next-hop neighbors of router 210.

Additionally, in one embodiment, one or more policy features are downloaded from router 210 to offload platform 220 for accordingly processing packets.

Figure 2B:
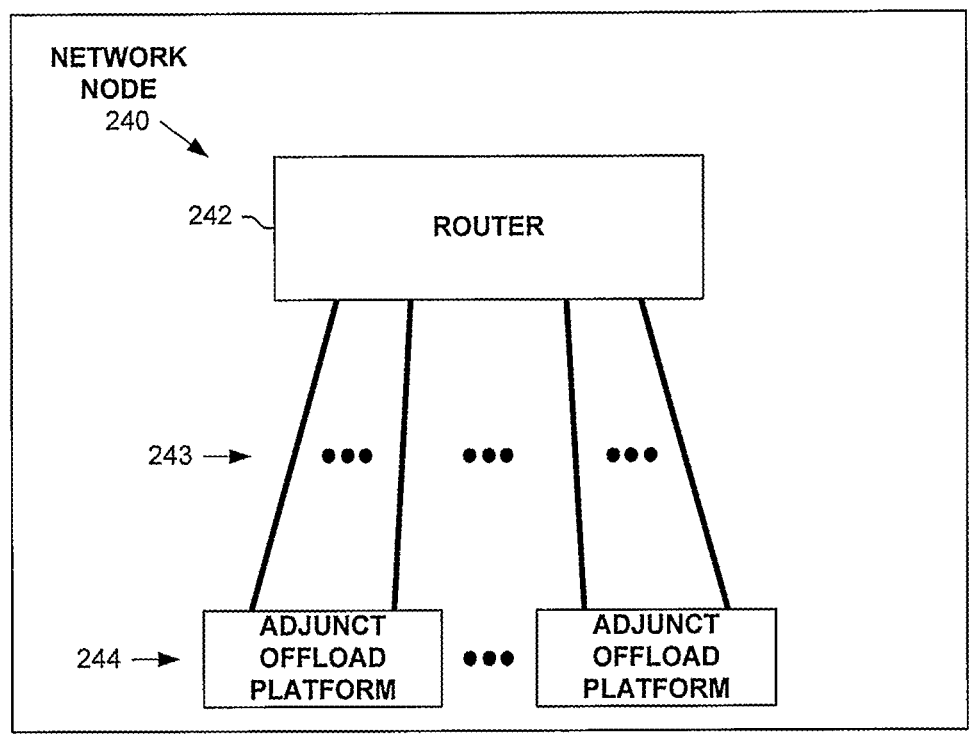
FIG. 2B illustrates a network node according to one embodiment.

FIG. 2B illustrates network node 240 according to one embodiment, with network node including router 242 communicatively coupled to each of one or more adjunct offload platforms 244 via one or more links 243 (and corresponding interfaces on the devices 242, 244). Network node 240 appears to other network nodes as a single network node—that being router 242, with offload platform 244 being adjunct (attached to router 242 in a dependent or subordinate role) as it relies routing information (e.g., from a routing information base) from router 242 in determining egress forwarding values and possibly in applying a forwarding feature to a packet.

In one embodiment, a single link 243 is used between router 242 and an offload platform 244. In one embodiment, multiple links 243 are used between router 242 and an offload platform 244 to increase the scale and/or redundancy. In one embodiment, router 242 is communicatively coupled (243) to a single offload platform 244. In one embodiment, router 242 is communicatively coupled (243) to multiple offload platforms 244 to increase the scale and/or redundancy. In one embodiment, router 242 uses a load balancing mechanism to distribute the load over the available links 243 to one or more offload platforms 244. In one embodiment, an offload platform 244 is communicatively coupled (possibly remotely through other network nodes) to router 242 via a tunnel (e.g., MPLS/GRE).

In one embodiment, offload platform 244 is implemented in a standalone chassis (e.g., not physically part of router 242), in contrast to a card that is added to router. In one embodiment, offload platform 244 is implemented on a service blade in the chassis of router 242.

Figure 2C:
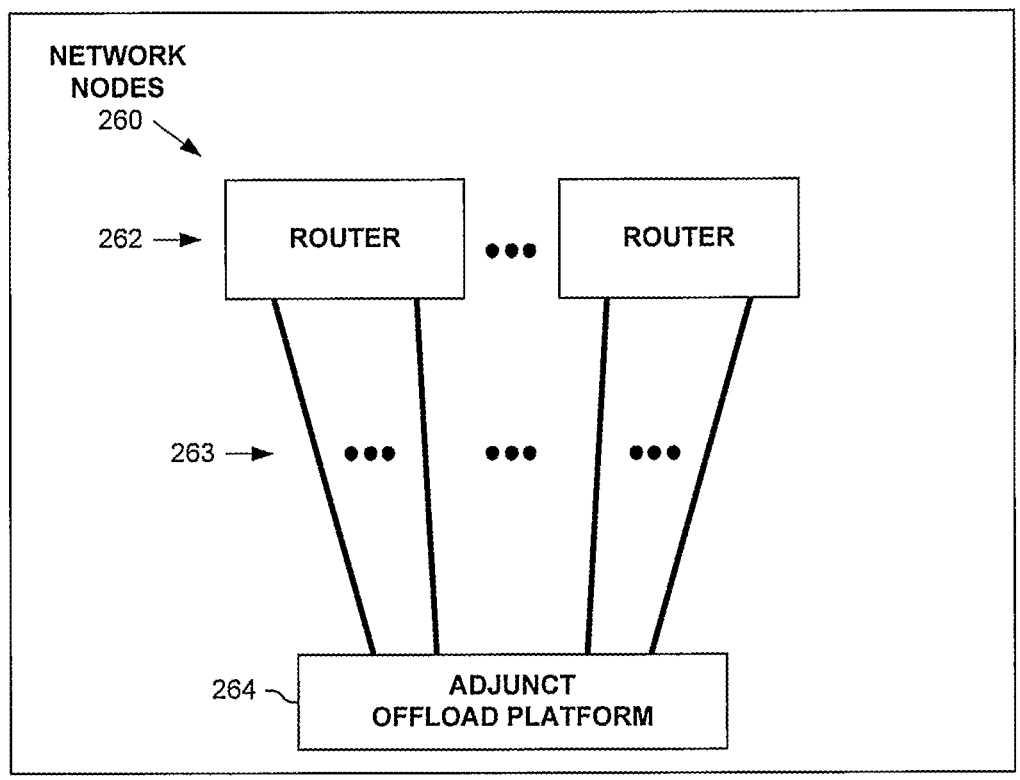
FIG. 2C illustrates network nodes according to one embodiment.

FIG. 2C illustrates multiple network nodes 260 (e.g., each router 262) according to one embodiment in which offload platform 264 serves each of multiple routers 262. Offload platform 264 is communicatively coupled via one or more communications links 263 to each of multiple routers 262. Offload platform 264 is adjunct to each of routers 262 (attached in a dependent or subordinate role) as it relies on routing information (e.g., from a routing information base) from each of routers 262 in determining corresponding egress forwarding values and possibly application of a forwarding feature to a packet.

Figure 3A:
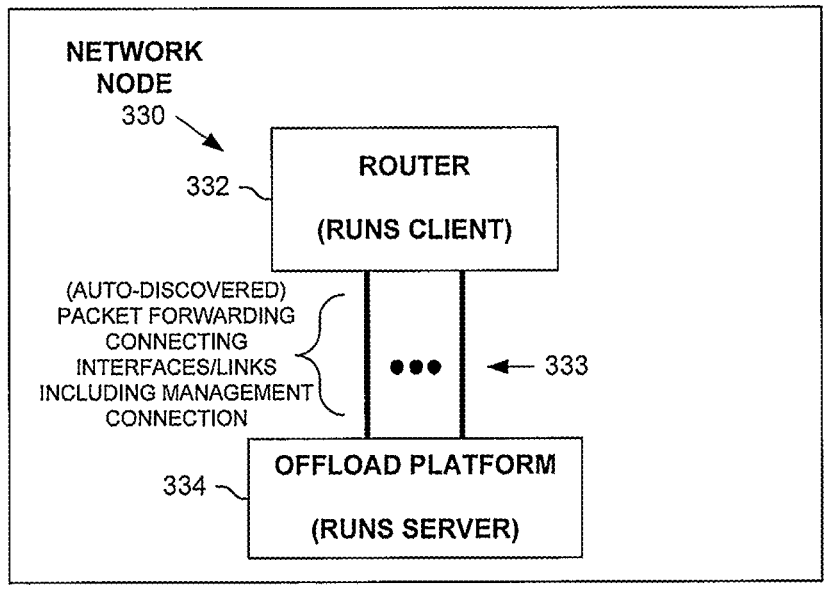
FIG. 3A illustrates a network node according to one embodiment.

FIG. 3A illustrates a network node 330 including router 332 communicatively coupled via one or more links 333 with offload platform 334. In one embodiment, offload platform 334 is controlled managed (possibly completely) by router 332. In one embodiment, configuration and forwarding information is downloaded from router 332 to offload platform 334. In one embodiment, offload platform 334 is automatically configured so as to provide a zero-touch experience in communicatively coupling offload platform 334 to router 332.

In one embodiment, offload platform 334 is a general-purpose compute platform or Vector Packet Processing (VPP) platform added to a network and associated with router 334. In one embodiment, router 332 is offload platform 334's controller.

In one embodiment, a customer manages offload platform 334 through an network management or command line interface. One embodiment does not require a network wide orchestration. In one embodiment, a central controller manages offload platform 334, such as by, but not limited to, through the communicatively coupled (possibly directly connected) router 332.

In one embodiment, the software architecture of offload platform 334 is viewed in terms of the functions including: bootstrapping, control plane transport, generic forwarding architecture, feature specific functions, and traffic classification.

In one embodiment, offload platform 334 does not store any state. Rather, a router application programing interface (API) directly invokes the binary API of offload platform 334 for connection(s) 333 to router 332. Forwarding data is automatically download to offload platform 334, such as, but not limited to, responsive to an establishment of a connection 333 between offload platform 334 and router 332, possibly in response to a restarting of offload platform 334 or router 332. One embodiment includes HA, Mark-Sweep support. In one embodiment, Google Protocol Buffers (GPB) are used to program line cards of router 332 as well as offload platform 334.

In one embodiment, offload platform 334 is inserted in a network by connecting (333) it through a regular interface port on router 332 (e.g., not requiring an entire slot). In one embodiment, router 332 and offload platform 334 are assigned IP addresses, with a connection (333) established between router 332 and offload platform 334. In one embodiment, router 332 runs a Dynamic Host Configuration Protocol (DHCP) server that assigns an address to offload platform 334 when it connects to router 332 or a network.

One embodiment uses Hello messages between router 332 and offload platform 334. In one embodiment, these Hello messages are multicast onto the interface port. In this manner, each of router 332 and offload platform 334 learn about each other's existence. One embodiment uses this mechanism to assign an IP address to offload platform 334. In one embodiment, offload platform's Hello message is also beneficial for OAM purposes and/or capability negotiations.

Figure 3B:
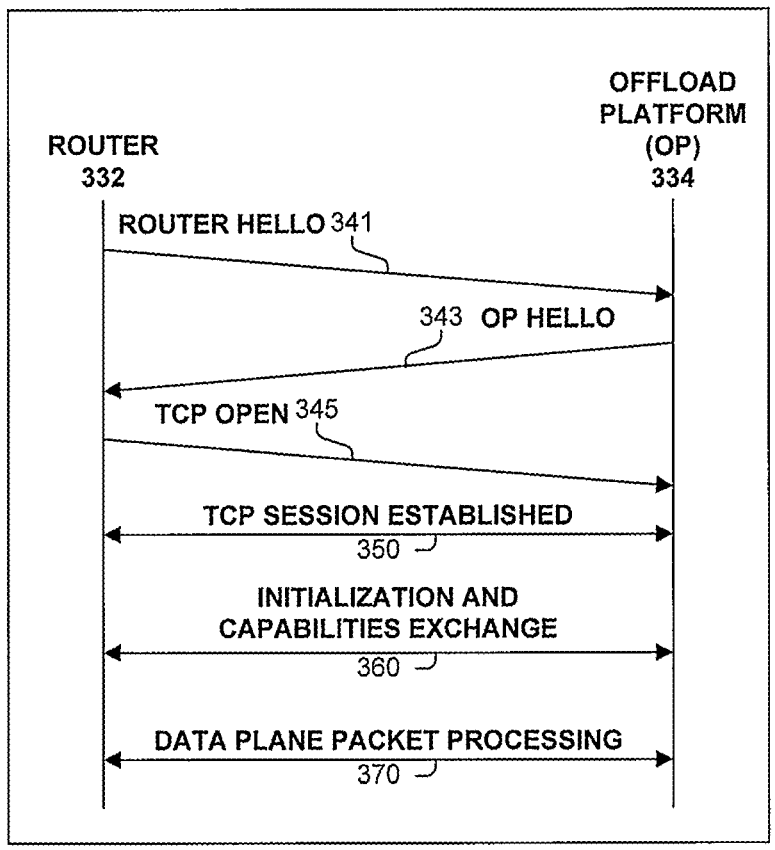
FIG. 3B illustrates communications between a router and an offload platform according to one embodiment.

FIG. 3B illustrates a set of messages exchanged between router 332 and offload platform 334 according to one embodiment. Router 332 and offload platform 334 discover each other via Hello messages (341, 343) communicated between them.

In response, a TCP session is opened (345) using discovered IP addresses, with the TCP session being established (350). In one embodiment, the TCP session is sourced from the IP addresses configured on the interfaces of router 332 and offload platform 334. In one embodiment, multiple links are used between router 332 and offload platform 334, typically with multiple TCP sessions being established there between. In one embodiment, information that is exchanged between router 332 and offload platform 334 is encoded using, such as, but not limited to, Google Protocol Buffers (GPB), Secure Shell (SSH), Google Remote Procedure Calls (gRPC).

In one embodiment, initialization and capability exchange (360) is then performed between a client process on router 332 and a server process on offload platform 334 over an established TCP session. In one embodiment and as part of this initialization (360), the client process on router 332 signals a unique identifier that identifies router 332. Using this identifier, offload platform 334 is aware of the TCP session(s) that belong to the same router 332, as in one embodiment, offload platform 334 has connection(s) to and serves multiple routers. In one embodiment, an MPLS Label is signaled from the offload platform to each router for use in distinguishing which traffic belongs to which router. In one embodiment, a server process on offload platform 334 helps to bootstrap including by connecting to the binary API. In one embodiment, offload platform 334 discovers the interfaces assigned for packet processing, enables the interfaces for Dynamic Host Configuration Protocol (DHCP) and Multiprotocol Label Switching (MPLS), and signals its assigned IP address to router 332. In one embodiment, router 332 automatically discovers which interfaces are in use by offload platform 334 through the assigned IP address.

After initialization (360), router 332 and offload platform 334 data plane process (370) packets.

Figure 4A:
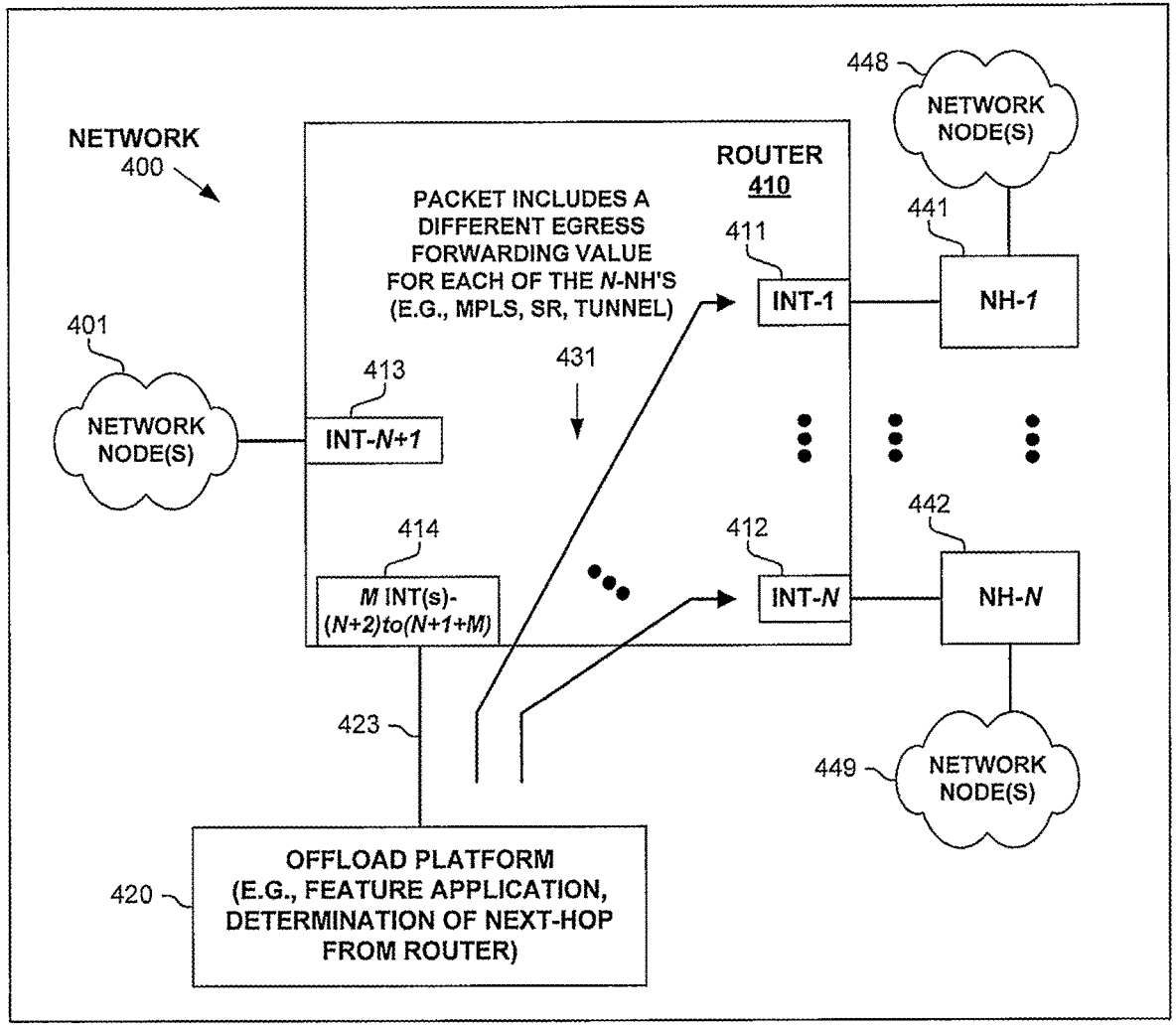
FIG. 4A illustrates a network operating according to one embodiment.

FIG. 4A illustrates a network 400, including router 410 operating according one embodiment and offload platform 420 operating according to one embodiment. Router 410 includes one or more (M, M>0) interfaces 414 used in communicating with offload platform 420 over communications link(s) 423. Router 410 includes interfaces 411, 412, 413 that provide packet communications with network nodes 441, 442, 401. Providing communications to other network nodes (448, 449) in network 400 according to one embodiment, network nodes 441-442 are the next-hop nodes of router 410 to which packets processed by offload platform 420 may be sent In one embodiment, offload platform 420 is used for many different forwarding functions that use forwarding table(s) stored in offload platform 420. In one embodiment, these forwarding table(s) basically include information replicated from forwarding table(s) of router 410. In response to the establishment of a connection between router 410 and offload platform 420, information from forwarding table(s) is downloaded to offload platform 420.

One embodiment uses this forwarding information with limited modification by representing interfaces 411-412 of router 410 as virtual interfaces on offload platform 420 with the next hops 441-442 of router 410 represented as virtual adjacencies.

In one embodiment, MPLS or another protocol is used to encapsulate and communicate packets between router 410 and offload platform 420.

In one embodiment, an encapsulating packet sent from router 410 to offload platform 420 includes an offload feature value (e.g., a label, address, tunnel identification) representing the feature(s) to be applied to the packet encapsulated therein.

In one embodiment, an encapsulating packet sent from offload platform 420 to router 410 includes an egress forwarding value (e.g., a label, address, tunnel identification) effectively representing the next hop (441-442) to which router 410 is to send the packet encapsulated therein. In other words, the egress forwarding value provides a next-hop adjacency indicating which router interface/adjacency that router 410 will use to send out the packet. In this manner, offload platform effectively performs a forwarding lookup operation that would otherwise be performed by router 410. Thus in one embodiment, offload platform 420 applies feature(s) to a packet as well as offloading (from the processing requirements of router 410) a forwarding lookup operation on the offload-platform processed packet.

For each next hop 441-442 of router 410 to which a packet processed by offload platform might be sent, one embodiment establishes a different tunnel (logically illustrated by the lines associated with reference number 431) with a corresponding virtual adjacency having been established for use in communicating packets from offload platform 420 to router 410. The particular egress forwarding value identifies the corresponding one of these tunnels.

Figure 4B:
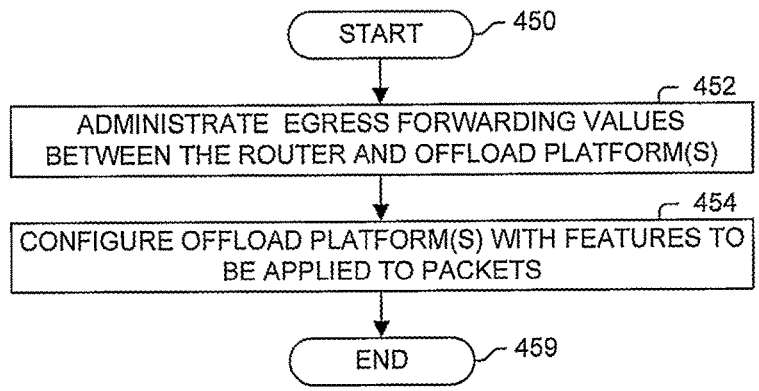
FIG. 4B illustrates a process according to one embodiment.

FIG. 4B illustrates a process performed in one embodiment. Processing begins with process block 450.

In process block 452, egress forwarding indicators (e.g., labels) are administered between the router and offload platform(s), such as, but not limited to, the router (e.g., via an offload-client process) providing to each offload platform (e.g., via its offload-server process) with egress forwarding values (e.g., labels, tunnel identifications, segment routing identifiers) corresponding to next-hop routes of the router. With reference to FIG. 4A and in one embodiment, router 410 provides offload platform 420 with a different egress forwarding value for each of its N interfaces 411-412 and with router 410 configured to decapsulate and correspondingly forward a packet received from offload platform 420 according to the egress forwarding value in the received encapsulating packet.

Continuing with process block 454 of FIG. 4B, the offload platform(s) are configured with feature(s) to be applied to packets. In one embodiment, an offload platform provides a feature that requires forwarding plane processing of packets that includes, but is not limited to, Hybrid Information-Centric Networking (Hybrid-ICN), IPv6, in-band Operations Administration Maintenance (In-situ OAM), Segment Routing (e.g., SRv6), Analytics, Multicast only Fast Re-Route (MoFRR) path selector function (e.g., deduplication), replication in general, Bit Indexed Explicit Replication (BIER), Internet Protocol version 6 (IPv6), mLDP (Multipoint Label Distribution Protocol), and/or supplemental processing such as when a packet switching device runs out of hardware resources (e.g., Access Control List (ACL) tables, Ternary Content-addressable Memory entries, binary TCAM, Content-addressable Memory entries).

Processing of the flow diagram of FIG. 4B is complete as indicated by process block 459.

Figure 4C:
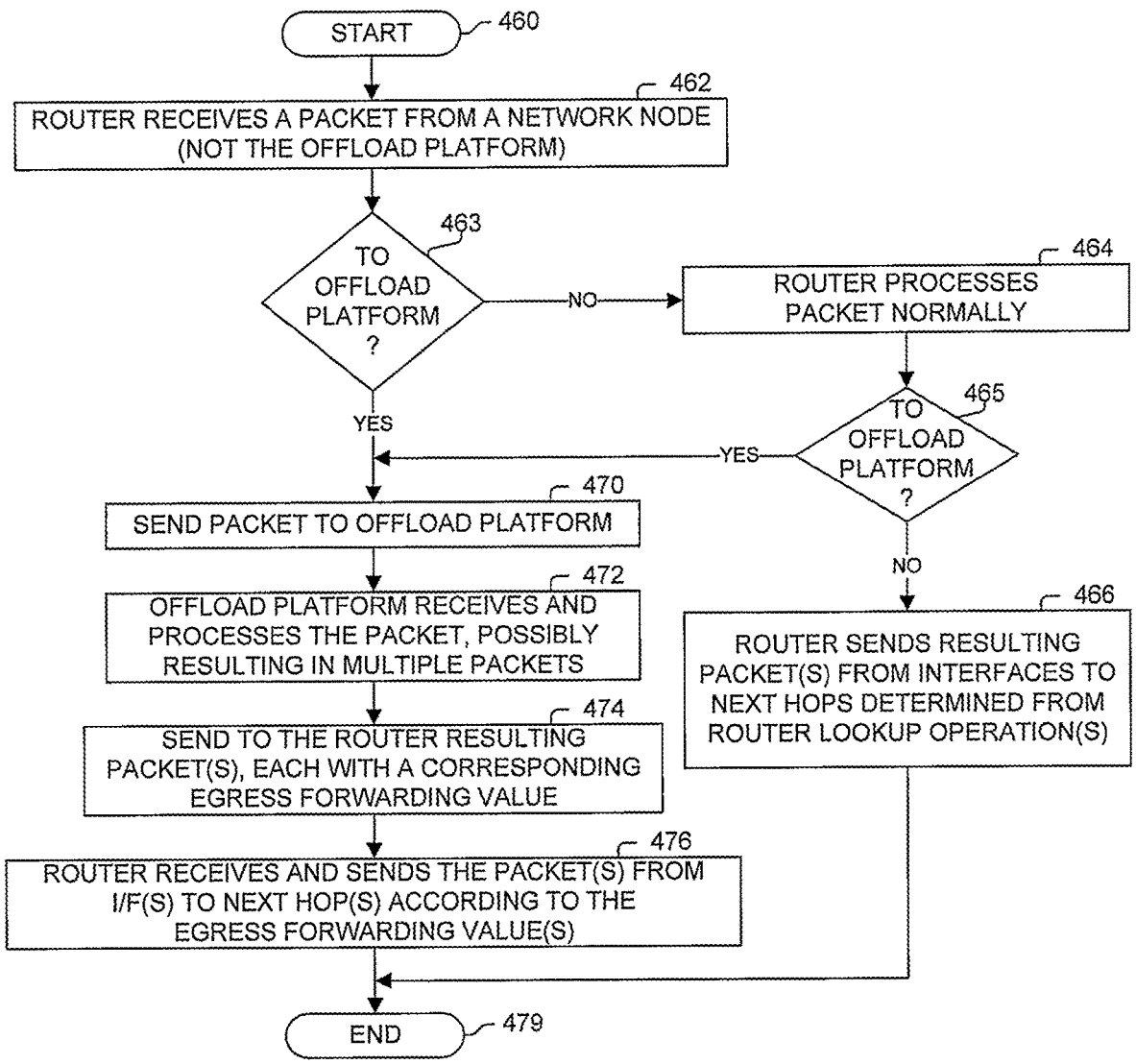
FIG. 4C illustrates a process according to one embodiment.

FIG. 4C illustrates a process performed in one embodiment. Processing begins with process block 460. In process block 462, the router receives a packet from another network node (not from the offload platform). As determined in process block 463 (such as via a classification operation), if the received packet is to forwarded to the offload platform before other processing by the router, then processing proceeds to process block 470; otherwise processing proceeds to process block 464.

Continuing in process block 464, the router performs packet processing operations on the received packet. As determined in process block 465, if the received packet is to forwarded to the offload platform, then processing proceeds to process block 470; otherwise processing proceeds to process block 466.

Continuing in process block 466, the router sends resulting packet(s) from interfaces to next-hop node(s) determined from lookup operations. Processing proceeds to process block 479.

Continuing in process block 470, the packet is sent to the offload platform. In process block 472, the offload platform receives and processing the packet, possibly resulting in multiple packets. In process block 474, the offload platform sends the offload-platform processed packet(s), each with a corresponding egress forwarding value, to the router. In process block 476 and for each of these sent packet(s), the router receives the packet and sends it (e.g., after decapsulating it from its encapsulating packet) from an interface to a next-hop node according to the egress forwarding value associated with the received packet. Processing proceeds to process block 479.

Processing of the flow diagram of FIG. 4C is complete as indicated by process block 479.

Figure 5A:
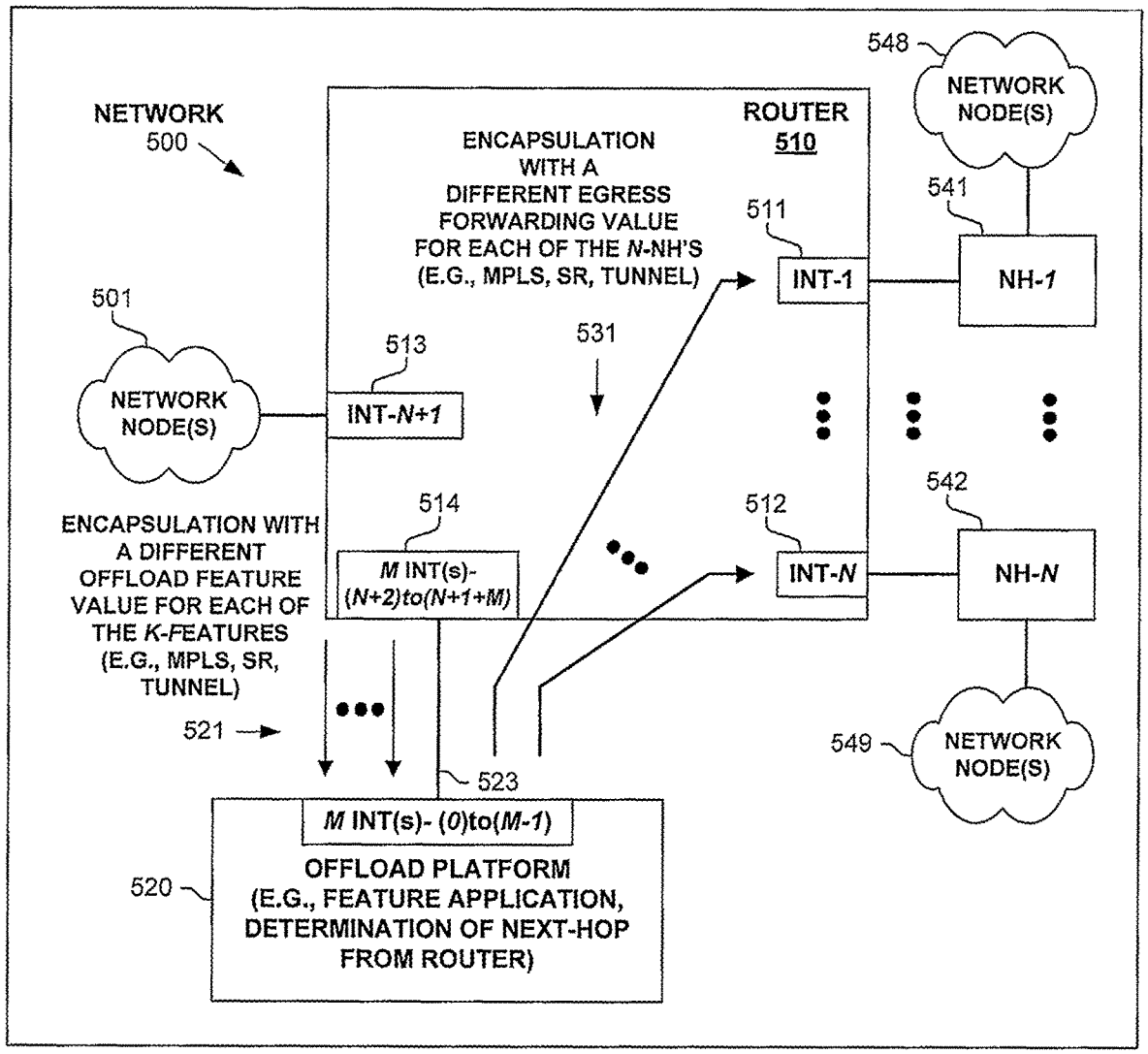
FIG. 5A illustrates a network operating according to one embodiment.
Figure 5B:
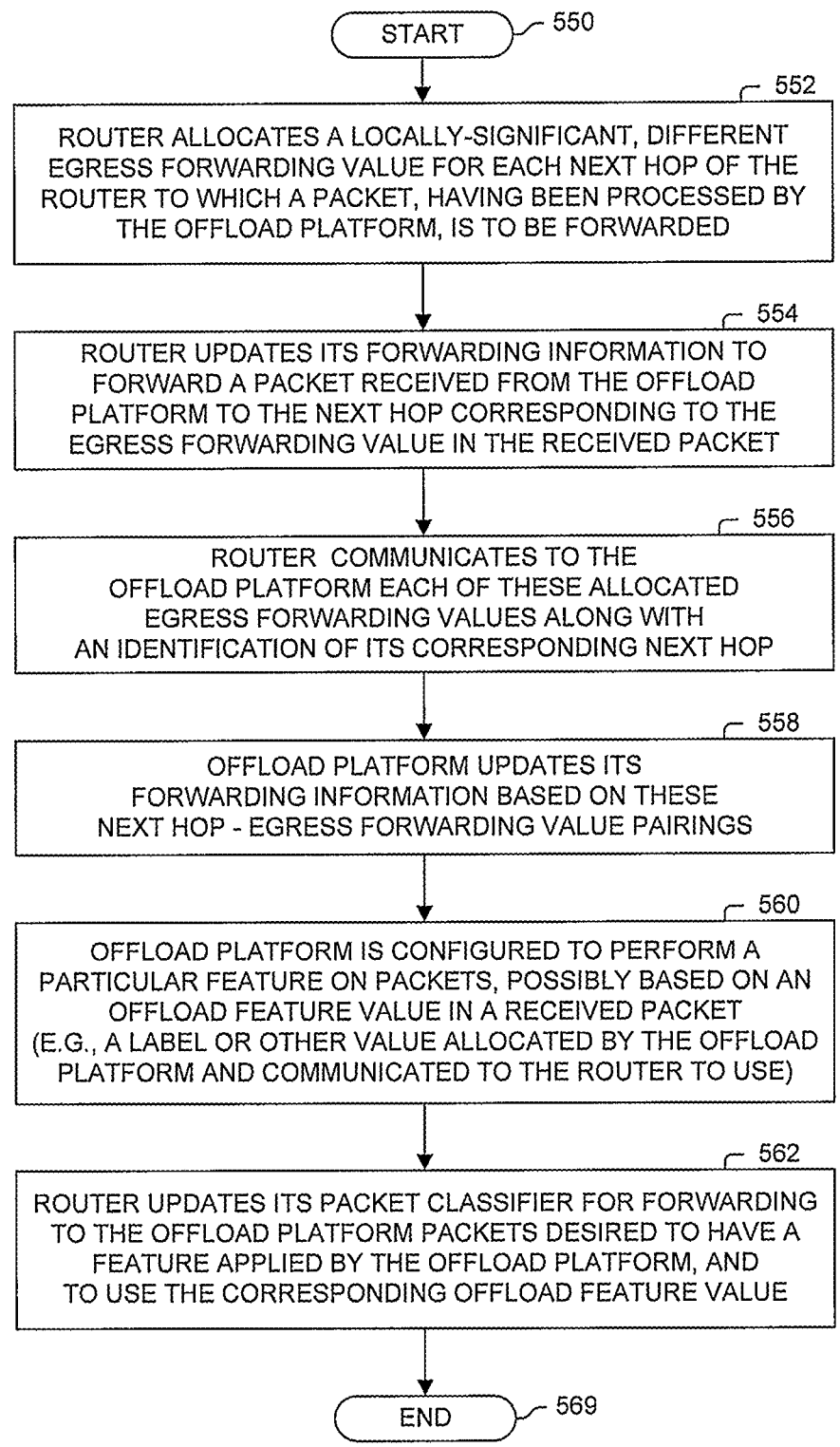
FIG. 5B illustrates a process according to one embodiment.
Figure 5C:
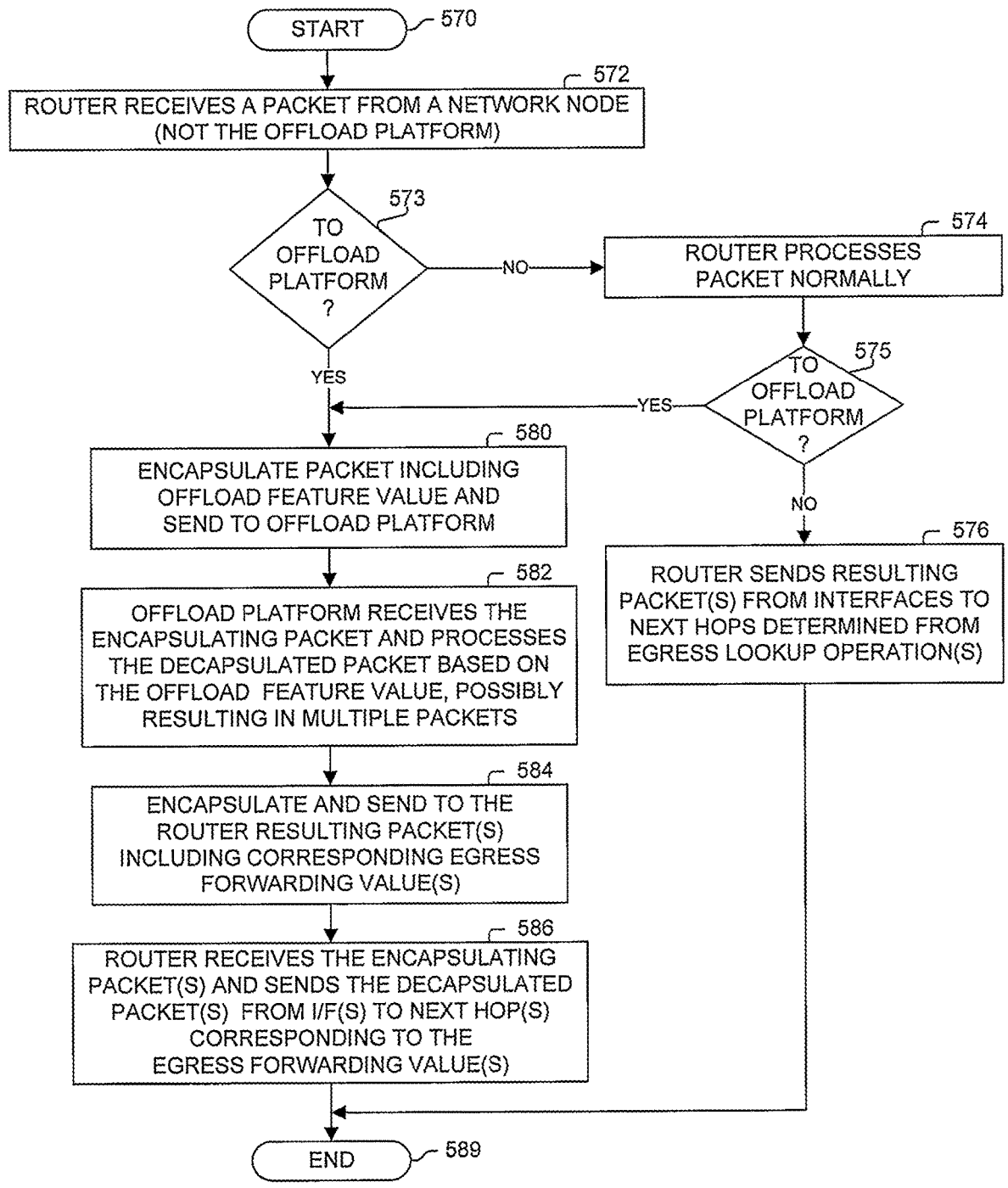
FIG. 5C illustrates a process according to one embodiment.

FIG. 5A illustrates a network 500, including router 510 operating according one embodiment and offload platform 520 operating according to one embodiment. FIGS. 5A-C expressly illustrate the use of packet encapsulation for communicating packets to offload platform 520 for processing and the use of packet encapsulation for returning offload-platform packets to router 510.

Router 510 includes one or more (M, M>0) interfaces 514 used in communicating with offload platform 520 over communications link(s) 523. Router 510 includes interfaces 511, 512, 513 that provide packet communications with network nodes 541, 542, 501. Providing communications to other network nodes (548, 549) in network 500 according to one embodiment, network nodes 541-542 are the next-hop nodes of router 510 to which packets processed by offload platform 520 may be sent.

In one embodiment, offload platform 520 is used for many different forwarding functions that use forwarding table(s) stored in offload platform 520. In one embodiment, these forwarding table(s) basically include information replicated from forwarding table(s) of router 510. In response to the establishment of a connection (523) between router 510 and offload platform 520, information from forwarding table(s) are downloaded to offload platform 520.

One embodiment uses this forwarding information with limited modification by representing interfaces 511-512 of router 510 as virtual interfaces on offload platform 520 with the next hops 541-542 of router 510 represented as virtual adjacencies.

In one embodiment, MPLS or another protocol is used to encapsulate and communicate packets between router 510 and offload platform 520.

In one embodiment, an encapsulating packet sent from router 510 to offload platform 520 includes an offload feature value (e.g., a label, address, tunnel identification) representing the feature(s) to be applied to the packet encapsulated therein. One embodiment establishes a tunnel (logically illustrated by the lines associated with reference number 521) for each feature to be applied to packets by offload platform 520.

In one embodiment, an encapsulating packet sent from offload platform 520 to router 510 includes an egress forwarding value (e.g., a label, address, tunnel identification) effectively representing the next hop (541-542) to which router 510 is to send the packet encapsulated therein. In other words, the egress forwarding value provides a next-hop adjacency indicating which router interface/adjacency that router 510 will use to send out the packet. In this manner, offload platform effectively performs a forwarding lookup operation that would otherwise be performed by router 510. Thus in one embodiment, offload platform 520 applies feature(s) to a packet as well as offloading (from the processing requirements of router 510) a forwarding lookup operation on the offload-platform processed packet.

For each next hop 541-542 of router 510 to which a packet processed by offload platform might be sent, one embodiment establishes a different tunnel (logically illustrated by the lines associated with reference number 531) with a corresponding virtual adjacency having been established for use in communicating packets from offload platform 520 to router 510. The particular egress forwarding value identifies the corresponding one of these tunnels.

FIG. 5B illustrates a process performed in one embodiment. Processing begins with process block 550.

In process block 552, egress forwarding indicators (e.g., labels) are administered between the router and offload platform(s), such as, but not limited to, the router (e.g., via an offload-client process) providing to each offload platform (e.g., via its offload-server process) with egress forwarding values (e.g., labels, tunnel identifications, segment routing identifiers) corresponding to next-hop routes of the router. With reference to FIG. 5A and in one embodiment, router 510 provides offload platform 520 with a different egress forwarding value for each of its N interfaces 511-512 and with router 510 configured to decapsulate and correspondingly forward a packet received from offload platform 520 according to the egress forwarding value in the received encapsulating packet.

Continuing with process block 554 of FIG. 5B, the router updates its forwarding information so as to forward a packet (e.g., after its decapsulation) received from the offload platform to the next hop corresponding to the egress forwarding value in the received packet. In process block 556, the router communicates, to the offload platform, each of these allocated egress forwarding values along with an identification of its corresponding next hop. In process block 558, the offload platform updates its forwarding information based on these next hop—egress forwarding value bindings.

In process block 560, the offload platform is configured to perform a particular feature on packets, typically based on an offload feature value in a received packet (e.g., label in the encapsulating packet, with the label having been prior allocated by the offload platform and communicated to the router).

One embodiment identifies/classifies packets to determine those packets that will be forwarded from the router to the offload platform for processing. Upon identifying this traffic, the packets are forwarded to the offload platform using the offload feature value (e.g., MPLS label) that was assigned by the offload platform to the router during an initialization phase, with these packets being encapsulated (e.g., using MPLS). Using MPLS allows one embodiment to serve multiple routers and/or support Virtual Private Network (VPN) services on the offload platform.

One embodiment uses one or more of the following three mechanisms in the router to classify and forward selected traffic (e.g., packets) to the offload platform: prefix-based forwarding, MPLS-based forwarding, and/or access control list (ACL) based forwarding.

In one embodiment, the router's routing information base (RIB) is used in programming a particular prefix in a forwarding information base (FIB) based on the routing information that has been received via a routing protocol (e.g., Internet Gateway Protocol (IGP)). In one embodiment, particular traffic to be send to the offload platform is identified through packet classification based on a prefix. In one embodiment, an offload-client process in the router installs the same prefix, with higher priority, and a new path list that includes interface(s) and address(es) of the offload platform as the next hop. In one embodiment, the RIB route is not be changed, and the offload platform has the original paths for the prefix. In this manner, when router receives the packet back from the offload platform, the router forwards the packet according the RIB path information (e.g., as the egress forwarding value reflects the RB path).

Certain traffic is readily identified by its MPLS label. For example, Bit Indexed Explicit Replication (BIER) allocates its own label and advertises that through the control plane to its neighboring routers. If a router is not able to perform BIER forwarding in hardware, the BIER labels can be programmed in MPLS forwarding as unicast cross-connects with interface(s) and address(es) of the offload platform as the next hop. This is mechanism can be used to re-direct traffic to the offload platform for processing and will work for any MPLS feature and its corresponding MPLS label(s) included in packets received by the router.

ACL-based forwarding allows matching against many different parts of the IPv4/IPv6 header (e.g., Source Address, Destination Address, Port Numbers, Protocol Numbers, etc.). ACL-based forwarding provides fine-granular packet classification for identifying packets to send to the offload platform for processing. In one embodiment, the ACL-based forwarding features allows classified packets to be redirected to a next hop, that in turn can also be recursively forwarded over a MPLS path. In one embodiment, the router installs interface(s) and address(es) of the offload platform for forwarding packets that are correspondingly identified by an ACL-based forwarding decision to be sent to the offload platform.

In process block 562, the router updates its programming so that the packet classifier identifies those packets to send to the offload platform, as well as to encapsulate these packets in encapsulating packets that include the corresponding offload feature value.

Processing of the flow diagram of FIG. 5B is complete as indicated by process block 569.

FIG. 5C illustrates a process performed in one embodiment. Processing begins with process block 570. In process block 572, the router receives a particular packet from another network node (not from the offload platform). As determined in process block 573 (such as via a classification operation), if the received particular packet is to forwarded to the offload platform before other processing by the router, then processing proceeds to process block 580; otherwise processing proceeds to process block 574. Continuing in process block 574, the router performs packet processing operations on the particular packet. As determined in process block 575, if the particular packet is to forwarded to the offload platform, then processing proceeds to process block 580; otherwise processing proceeds to process block 576.

Continuing in process block 576, the router sends resulting packet(s) from interfaces to next-hop node(s) determined from lookup operations. Processing proceeds to process block 589.

Continuing in process block 580, the particular packet is encapsulated, with the encapsulating packet including a corresponding offload feature value (e.g., label, tunnel identification, segment routing identifier) to identify to the offload platform the sending router and/or feature to apply to the packet. The encapsulating packet is sent to the offload platform.

In process block 582, the offload platform receives the encapsulating packet. The decapsulated particular packet is processed (e.g., applies one or more features identified from the offload feature value) by the offload platform, possibly resulting in multiple packets. In process block 584, the offload platform encapsulates and sends each of the resultant one or more offload-platform processed packets in an encapsulating packet including the corresponding egress forwarding value effectively identifying to the router its next hop to which to send that packet.

In process block 586, the router receives the encapsulating packet(s). Each received encapsulating packet is processed, that includes sending its decapsulated offload-platform processed packet from an interface to a next-hop node according to the egress forwarding value extracted from its encapsulating packet. Processing proceeds to process block 589.

Processing of the flow diagram of FIG. 5C is complete as indicated by process block 589.

Figures 6A, 6B, 6C, 6D:
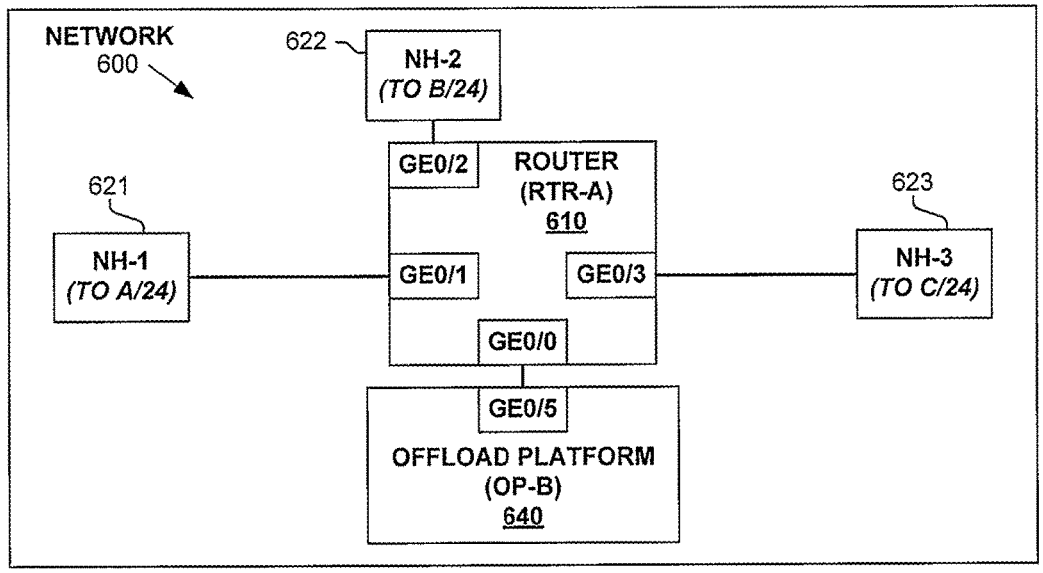
FIG. 6A illustrates a network according to one embodiment.
FIG. 6B illustrates a data structure used in one embodiment.
FIG. 6C illustrates a data structure used in one embodiment.
FIG. 6D illustrates various data structures used in one embodiment.

FIG. 6A illustrates a network 600 including router (RTR-A) 610 operating according to one embodiment and offload platform (OP-B) 640 operating according to one embodiment. Network 600 includes three routers NH-1 621, NH-2 622, and NH-3 623 that are next hop routers to router 610. In one embodiment, router 610 sends packets with a destination address matching A/24 to NH-1 (621), with a destination address matching B/24 to NH-2 (622), and with a destination address matching C/24 to NH-3 (623). The operation of network 600, including router 610 and offload platform 640, will be further described in relation to FIGS. 6B-D and 7A-C.

FIG. 6B illustrates entries (911-913) of an Internet Protocol (IP) forwarding (routing) table 910 of router 610 in the network 600 (before configuration to use offload platform 640) with the three installed prefixes of A/24, B/24, and C/24. As shown, IP forwarding table 910 includes entries (911-913) to cause to packets with a destination address matching prefix A/24 out its GE0/1 interface to NH-1 (entry 911), with a destination address matching prefix B/24 out its GE0/2 interface to NH-2 (entry 912), and with a destination address matching prefix C/24 out its GE0/3 interface to NH-3 (entry 913). In one embodiment, the next-hop information on the router is discovered through
Address Resolution Protocol (ARP) databases.

In one embodiment, the processing of a packet by the offload platform includes effectively performing a forwarding lookup operation (from the perspective of router) that the router would otherwise perform, thus reducing the router's processing requirements of an offload-processed packet. In one embodiment, the offload platform communicates the offload-processed packet over an MPLS tunnel or label switched path to the corresponding egress interface of the router, with next hop information associated with that tunnel.

In one embodiment, router 610 (e.g., an offload platform client process) allocates MPLS labels 201, 202, and 203 to respectively identify next hops NH-1 (621), NH-2 (622), and NH-3(623). In one embodiment, the offload platform client process allocates these labels from MPLS Label Switching Database (LSD) and install these labels into its forwarding information base via the LSD.

FIG. 6C illustrates entries (921-923) of an MPLS forwarding table 920 of router 610 that identify processing of received MPLS packets with corresponding labels. This processing identified in forwarding table 920 includes penultimate hop popping (PHP), that will cause a transported packet to be decapsulated from the received MPLS encapsulating packet.

In one embodiment, there is no Label Switch Router (LSR) connected to NH-1 (621), NH-2 (622), or NH-3 (623), and thus the MPLS Label is removed by router 610 (e.g., per penultimate hop popping (PHP)), with the decapsulated IP packet forwarded from router 610. Thus in one embodiment, the MPLS label is used simply to identify the outgoing router interface to use to send to the desired next hop. In one embodiment, MPLS is used to communicate packets between router 610 and offload platform 640, which does not impose any requirement for MPLS to be deployed in the customers network. MPLS is simply of local significance between router 610 and offload platform 640.

As shown, entry 921 identifies PNP and to forward the decapsulated packet from interface GE0/1 to NH-1 (621); entry 922 identifies PNP and to forward the decapsulated packet from interface GE0/2 to NH-2 (622); and entry 923 identifies PNP and to forward the decapsulated packet from interface GE0/3 to NH-3 (623). These next hops and label bindings are then advertised by the router 610 (e.g., offload platform client) to the offload platform 640 (e.g., offload platform server).

In one embodiment and in response to receiving the advertised next hop and label bindings, offload platform 640 creates corresponding virtual interfaces, with each virtual interface representing a corresponding physical interface on router 610. In one embodiment, these virtual interfaces are the head-end for the MPLS tunnels that will return data packets to the router 610, as well as out the interface to the next hop (621-623) to which the MPLS label was assigned.

In one embodiment, a forwarding information base of a router includes data structure 910 (FIG. 6B) and data structure 920 (FIG. 6C).

FIG. 6D illustrates a corresponding virtual interface table 930 used by one embodiment of offload platform 640. Offload platform 640 received the three next hops and label bindings advertised by router 610, and created three virtual interfaces (e.g., VIF -01, VIF-02, VIF-03). Virtual interface table includes one entry (931-933) for each virtual interface/label/next hop of router 640 association. As shown, entry 931 associates virtual interface VIF-01 with virtual next hop (e.g., a next hop of router 610) NH-1, label 201, and next hop RTR-A (e.g., router 610 is the next hop of offload platform 640). Entry 932 associates virtual interface VIF-02 with virtual next hop NH-2, label 202, and next hop RTR-A. Entry 933 associates virtual interface VIF-03 with virtual next hop NH-3, label 203, and next hop RTR-A.

In one embodiment, the offload platform client of router 610 is a "redistribution client" of the IP routing information base (RIB) of router 610, that has access to all of the IP prefixes that have been installed in router 610. In one embodiment, these IP prefixes and their corresponding next hops are advertised to, and installed in, offload platform 640. The interfaces handles in the routing information base of offload platform are typically rewritten to virtual interface handles (e.g., VIF-01, VIF-02, VIF-03).

FIG. 6D also illustrates a corresponding IP forwarding table 940 used by one embodiment of offload platform 640. Offload platform 640 received the three prefix next hop bindings advertised by router 610, and populated IP forwarding table 940 accordingly with the illustrated three entries (941-943). As shown, entry 941 associates prefix A/24 with NH-1 and VIF-01; entry 942 associates prefix B/24 with NH-2 and VIF-02; and entry 943 associates prefix C/24 with NH-3 and VIF-03.

FIG. 6D further illustrates MPLS forwarding table 950 of offload platform, which is currently not populated as shown by null entry 951.

In one embodiment, a forwarding information base of an offload platform includes data structures 930, 940, and 950 (FIG. 6D).

Figure 7A:
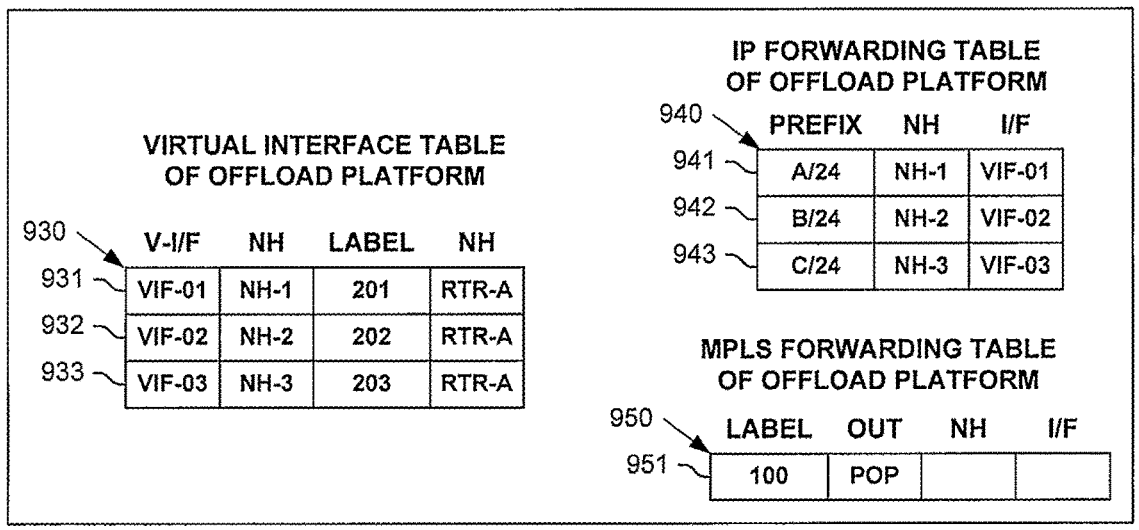
FIG. 7A illustrates various data structures used in one embodiment.
Figure 7B:
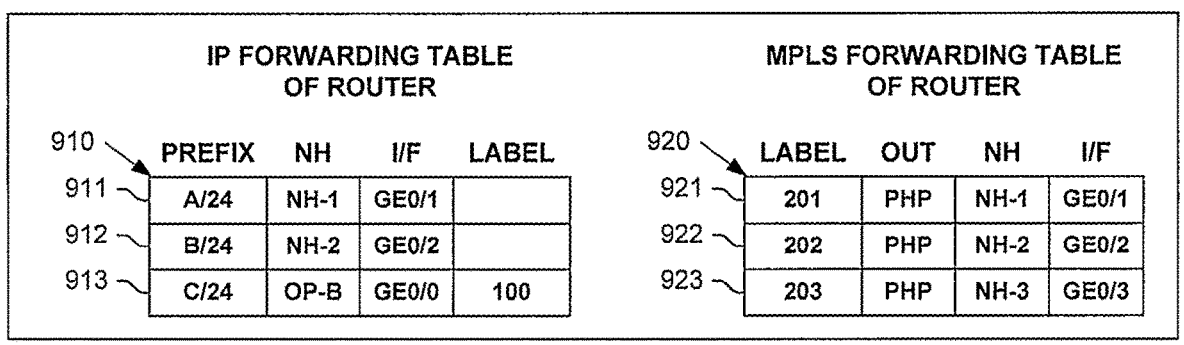
FIG. 7B illustrates various data structures used in one embodiment.
Figure 7C:
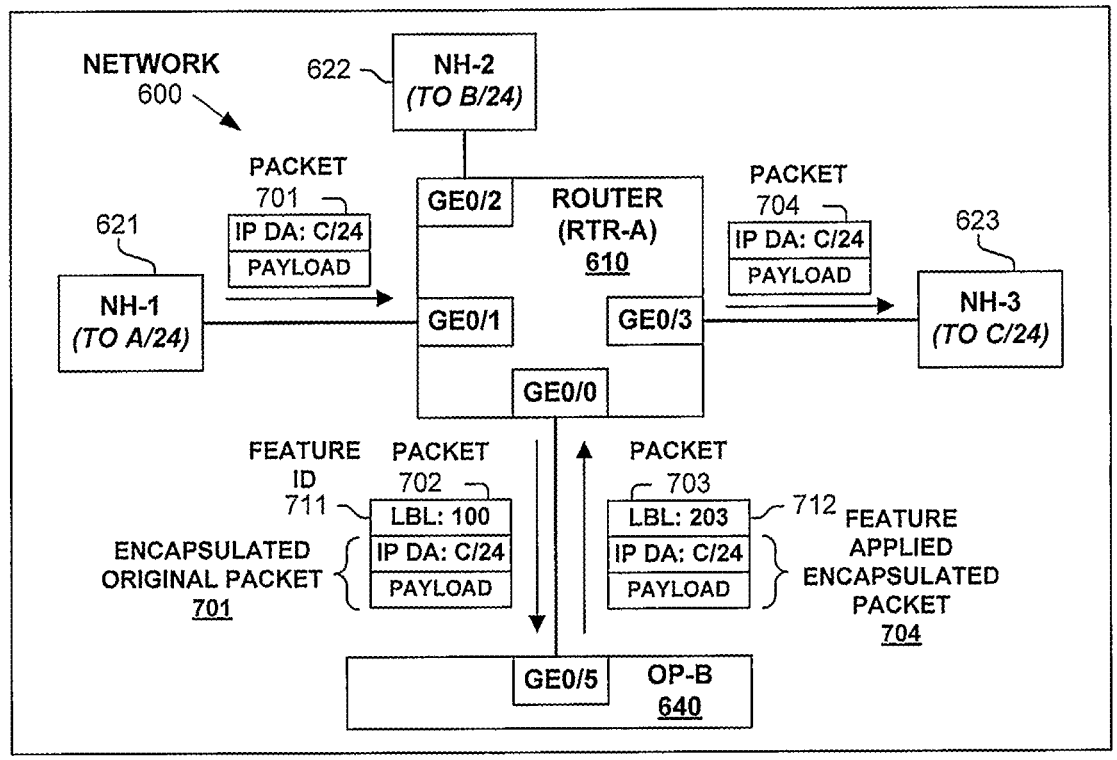
FIG. 7C illustrates a network operating according to one embodiment.

FIG. 7A illustrates offload platform's (640) the virtual interface table 930, IP forwarding table 940, and MPLS forwarding table 950 according to one embodiment associated with network 600 of FIGS. 6A and 7C. Virtual interface table 930 and IP forwarding table 940 are populated the same as described in relation to FIG. 6D. However, offload platform 640 has been programmed to apply feature(s) to packets that are received with an offload feature value of 100. Hence, entry 951 of MPLS forwarding table 950 is updated to include label 100 that will invoke processing by offload platform 640 of the received encapsulating packet. In one embodiment, this processing includes a pop operation to reveal the encapsulated packet, and to process the decapsulated packet including applying the corresponding feature(s), performing an egress forwarding lookup operation in identifying the corresponding egress forwarding value, and encapsulating and sending the encapsulated offload-platform processed packet to the router in an encapsulating packet including the egress forwarding value (e.g., label, tunnel identification, segment routing identifier).

In one embodiment, the offload-processed packet is an IP packet. Offload platform 640 performs a forwarding look operation on its IP Destination Address in IP forwarding table 940 (e.g., reflective of the RIB of router 610) that identifies a corresponding virtual interface (VIF-01, VIF-02 or VIF-03). Offload platform 640 then performs a lookup operation in virtual interface table 930 resulting in the identification of the egress forwarding value (e.g., label 201, 202 or 203) and router 610 (RTR-A) as the next hop to which the encapsulating packet (with the egress forwarding value) is sent to router 610.

In one embodiment, offload platform 640 allocates the offload feature value (100) and provides it to router 610, which updates its forwarding information in one or more of its forwarding information bases.

In one embodiment, a forwarding information base of an offload platform includes data structures 930, 940, and 950 (FIG. 7A).

FIG. 7B illustrates Internet Protocol (IP) forwarding (routing) table 910, with entry 913 being updated from that shown in FIG. 6B. Updated entry 913 will cause router 610 to process differently received IP packets with a Destination Address matching prefix C/24. In particular, entry 913 directs router 610 to encapsulate the IP packet in an MPLS packet using label 100, and to send the MPLS packet out interface GE0/0 to next hop offload platform 640. MPLS forwarding table 920 of router 920 is not changed from that shown in FIG. 6C (as it is configured for processing MPLS packets received from offload platform 640 based on its label/egress forwarding label).

In one embodiment, a forwarding information base of a router includes data structures 910 and 920 (FIG. 7B).

FIG. 7C illustrates network 600 (also shown in FIG. 6A) operating according to one embodiment such as that using the forwarding information illustrated in FIGS. 7A and 7B. As shown, data or probe IP packet 701 is received by router 610 on interface GE0/1 from NH-1 (621). Router 610 classifies the packet with a matching prefix C/24 (e.g., entry 913 of FIG. 7B is identified) resulting in a determination to encapsulate the IP packet in an MPLS packet 702 with the label 100 (711) (assigned by offload platform 640 in one embodiment), and to send the MPLS packet 702 to offload platform (OP-B) 640 out interface GE0/0.

Offload platform 640 receives MPLS packet 702. Responsive to label 100 (711) and entry 951 of MPLS forwarding table 950 (FIG. 7A), offload platform 640 decapsulates and processes IP packet 701. This processing includes applying the feature(s) corresponding to label 100 (711). The Destination Address of offload-platform processed IP packet used in a lookup operation to determine the outgoing tunnel interface and next hop. This destination address matches entry 943 (FIG. 7A) that identifies VIF -03, with this virtual interface matching entry 933, that identifies egress forwarding value (MPLS label) 203 and the next hop being router 610 (RTR-A). Offload platform 640 creates MPLS packet 703 with label 203 (712) encapsulating offload-platform processed packet 704, and sends packet 703 to router 610.

Router 610 receives and processes MPLS packet 703. Using label 203 (712), entry 923 of MPLS forwarding table (FIG. 7B) is identified and identifies packet processing operations that cause router 610 to decapsulate (per PHP entry) offload-platform processed packet 704 and to sends packet 704 out interface GE0/3 towards NH-3 (623).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method comprising:
receiving a packet from a node in a network;
performing a lookup operation in a router forwarding information base based on an Internet Protocol (IP) Destination Address of the packet matching an IP prefix corresponding to an entry identifying an offload platform as a destination for the packet;
receiving the packet by the offload platform from a router in the network;
offload-packet processing the packet by the offload platform resulting in an offload-processed packet including an egress forwarding value; and
sending the offload-processed packet by the offload platform towards the router, wherein the offload platform is a computing platform adjunct to the router, and wherein the offload-packet processing includes performing a forwarding lookup operation in an offload platform forwarding information base resulting in an identification of the egress forwarding value that effectively identifies a next-hop node of the router or corresponding egress interface of the router for reaching the next-hop node.

2. The method of claim 1, wherein the offload-processed packet is encapsulated, resulting in an encapsulated packet.

3. The method of claim 2, comprising:
receiving the encapsulating packet by the router; and
responsive to the egress forwarding value in the received encapsulating packet, the router sending the offload-packet processed packet towards the next-hop node from the corresponding egress interface.

4. The method of claim 3, wherein the egress forwarding value is a Multiprotocol Label Switching (MPLS) label.

5. The method of claim 1, wherein the offload platform forwarding information base is derived from a routing information base of the router.

6. The method of claim 1, wherein the compute platform processes the packet using Vector Packet Processing (VPP).

7. The method of claim 1, wherein a matching of the IP prefix in the offload platform forwarding information base results in the identification of the next-hop node of the router.

8. The method of claim 1, wherein the offload platform forwarding information base includes a virtual interface associated with the next-hop node; and wherein a matching of the IP prefix in the offload platform forwarding information base results in the identification of the virtual interface and the next-hop node of the router.

9. A system comprising:
at least one processor; and
at least one memory storing instructions, which when executed by the at least one processor, causes the at least one processor to:
receive a packet from a node in a network;
perform a lookup operation in a router forwarding information base based on an Internet Protocol (IP) Destination Address of the packet matching an IP prefix corresponding to an entry identifying an offload platform as a destination for the packet;
receive the packet by the offload platform from a router in the network;
offload-packet processing the packet by the offload platform resulting in an offload-processed packet including an egress forwarding value; and
send the offload-processed packet by the offload platform towards the router,
wherein the offload platform is a computing platform adjunct to the router, and
wherein the offload-packet processing includes performing a forwarding lookup operation in an offload platform forwarding information base resulting in an identification of the egress forwarding value that effectively identifies a next-hop node of the router or corresponding egress interface of the router for reaching the next-hop node.

10. The system of claim 9, wherein the offload-processed packet is encapsulated, resulting in an encapsulated packet.

11. The system of claim 10, further comprising instructions which when executed by the at least one processor, causes the at least one processor to:
receive the encapsulating packet by the router; and
responsive to the egress forwarding value in the received encapsulating packet, the router sends the offload-packet processed packet towards the next-hop node from the corresponding egress interface.

12. The system of claim 11, wherein the egress forwarding value is a Multiprotocol Label Switching (MPLS) label.

13. The system of claim 9, wherein the offload platform forwarding information base is derived from a routing information base of the router.

14. The system of claim 9, wherein the compute platform processes the packet using Vector Packet Processing (VPP).

15. The system of claim 9, wherein a matching of the IP prefix in the offload platform forwarding information base results in the identification of the next-hop node of the router.

16. The system of claim 9, wherein the offload platform forwarding information base includes a virtual interface associated with the next-hop node; and wherein a matching of the IP prefix in the offload platform forwarding information base results in the identification of the virtual interface and the next-hop node of the router.

17. At least one non-transitory computer-readable medium storing instructions, which when
executed by the at least one processor, causes the at least one processor to:
receive a packet from a node in a network; perform a lookup operation in a router forwarding information base based on an Internet Protocol (IP) Destination Address of the packet matching an IP prefix corresponding to an entry identifying an offload platform as a destination for the packet;
receive the packet by the offload platform from a router in the network;
offload-packet processing the packet by the offload platform resulting in an offload-processed packet including an egress forwarding value; and
send the offload-processed packet by the offload platform towards the router,
wherein the offload platform is a computing platform adjunct to the router, and
wherein the offload-packet processing includes performing a forwarding lookup operation in an offload platform forwarding information base resulting in an identification of the egress forwarding value that effectively identifies a next-hop node of the router or corresponding egress interface of the router for reaching the next-hop node.

18. The at least one non-transitory computer-readable medium of claim 17, wherein the offload-processed packet is encapsulated, resulting in an encapsulated packet.

19. The at least one non-transitory computer-readable medium of claim 18, further comprising instructions which when executed by the at least one processor, causes the at least one processor to:
receive the encapsulating packet by the router; and
responsive to the egress forwarding value in the received encapsulating packet, the router sends the offload-packet processed packet towards the next-hop node from the corresponding egress interface.

20. The at least one non-transitory computer-readable medium of claim 19, wherein the egress forwarding value is a Multiprotocol Label Switching (MPLS) label.

* * * * *